Aug. 30, 1955  W. T. GRUBB, JR  2,716,632
ELECTROLYTIC METHOD OF PRODUCING FLUORINE OR FLUORINE OXIDE
Filed Feb. 21, 1952
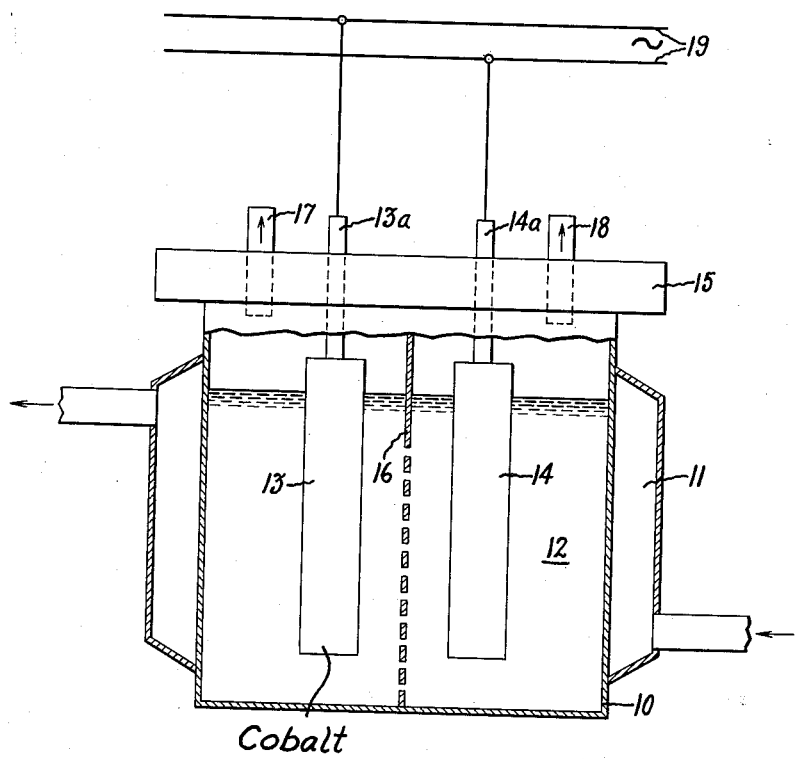
Inventor:
Willard T. Grubb, Jr.
by Paul C. Frank
His Attorney.

United States Patent Office 2,716,632
Patented Aug. 30, 1955

2,716,632

ELECTROLYTIC METHOD OF PRODUCING FLUORINE OR FLUORINE OXIDE

Willard T. Grubb, Jr., Schenectady, N. Y., assignor to General Electric Company, a corporation of New York Application February 21, 1952, Serial No. 272,747

4 Claims. (Cl. 204—60)

This invention relates to an electrolytic apparatus and process which utilizes alternating current to produce fluorine or fluorine oxide.

Electrolytic cells for the production of fluorine have been known for a number of years. In their conventional form, these cells consist of a cathode, which may be a steel plate, and an anode, which may be of carbon, the two being separated from each other by a diaphragm through which electrolyte is free to circulate. A commercial fluorine cell melt is available which consists of approximately 60% potassium fluoride, 39% hydrogen fluoride, and 1% lithium fluoride, the latter serving as a depolarizer. The diaphragm serves to prevent contact between the gases generated respectively at the cathode and anode. When a direct current energizes a cell of the conventional type, fluorine gas is evolved at the anode and hydrogen is evolved at the cathode.

Fluorine generating cells of the type heretofore known to the art have required direct current for their operation. The use of alternating current in this type of cell resulted in the production of both hydrogen and fluorine at each electrode. The affinity these gases have for each other results in violent explosions from their intermixture in concentrated form.

Accordingly, it is an object of this invention to provide a fluorine generating cell to be operated on alternating current.

It is another object of this invention to provide a method whereby alternating current may be utilized directly to produce fluorine or fluorine oxide.

Briefly stated, in accordance with one aspect of my invention, I have discovered that an electrolytic cell in which one of the electrodes has its exposed surface composed of cobalt will rectify alternating current thereby enabling the cell to produce fluorine or fluorine oxide, $OF_2$, while connected directly to a source of alternating potential.

The drawing is a diagrammatic view of an electrolytic cell illustrating the operation of my invention.

The cell illustrated comprises an electrolyte receptacle 10, which is normally circular or rectangular in plan, equipped with a temperature control jacket 11. An electrolyte bath 12 on the interior of the receptacle 10 is preferably composed of a standard fluorine cell melt consisting of about 60% KF, 39% HF, and 1% LiF. This melt is liquid at about 100° C., the normal operating temperature of the cell, but at higher concentrations of HF the melt may include other alkali fluorides. If it is desired to produce only fluorine, it is important that the melt be kept anhydrous. However, if it is desired to produce fluorine oxide, a small amount of water is added to the melt by suitable means such as a stream of moist air or an aqueous solution of HF. The quantity of water added must be kept small in order to avoid destroying the rectifying action of the cell. A 1% aqueous solution will generate fluorine oxide.

A pair of electrodes 13 and 14 are immersed in the melt 12. One of these electrodes, for example, the electrode 13, is composed of cobalt while the other electrode, for example, the electrode 14, is preferably composed of some material not severely attacked by hydrogen fluoride. Carbon or graphite as well as metals such as nickel and copper are satisfactory for this purpose. The electrodes 13 and 14 are equipped with terminals 13a and 14a respectively which protrude through a cover plate 15, the terminals being insulated from each other.

The interior of the cell is divided into two compartments by a diaphragm 16 which serves as a partition between the electrodes 13 and 14. Above the surface level of the electrolyte, the diaphragm 16 forms a solid partition but below the surface of the electrolyte, the diaphragm may be in the form of a screen composed of Monel metal, nickel, or other metals not readily attacked by hydrofluoric acid or of a polymeric tetrafluorethylene such as Teflon or similar organic materials which are stable in the presence of hydrofluoric acid and fluorine. The cover plate 15 has a pair of gas exit pipes 17 and 18 extending therethrough, the pipe 17 serving as an outlet for gases generated around the electrode 13 and the pipe 18 serving as an outlet for gases generated around the electrode 14. The terminals 13a and 14a are connected to an alternating current source 19.

When a cell of the above description is energized by an alternating current, the cobalt electrode 13 generates hydrogen which passes through the outlet pipe 17 and the electrode 14 generates fluorine which passes through the outlet pipe 18, provided the melt 12 is anhydrous. If a small quantity of water is present in the melt 12, fluorine oxide is given off around the electrode 14 and passes through the outlet pipe 18.

The presence of the cobalt electrode 13 imparts rectifying action within the cell. If the cell is energized with about 6 volts direct current, the resistance is about 12 ohms when the cobalt electrode 13 is negative and it is several thousand ohms when the cobalt electrode 13 is positive. When the cell is energized with 60 cycle alternating current, no current is passed at a potential of less than 8 volts R. M. S. while above 20 volts R. M. S. the rectifying qualities of the cell decline and some of the reverse current passes through the system. Within the range of 8 to 20 volts, the cobalt electrode 13 imparts excellent rectifying qualities to the cell thereby enabling it to function on alternating current. At voltages higher than 20 volts, the cell functions but with a lowered efficiency.

While the electrodes 13 and 14 are shown in the form of elongated elements, they may actually take a number of forms. For example, the walls of the receptacle 10 may be coated with cobalt (not shown) and this layer of cobalt would then serve as an electrode. Conversely, the walls of the receptacle 10 may be coated with the material of which the electrode 14 is composed. Cells of this type are well known in the art.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. The method of electrolytically generating a gas selected from the class consisting of fluorine and $OF_2$ with an alternating current which comprises positioning a first electrode composed substantially of cobalt in an electrolyte containing HF, an alkali fluoride and up to about 1% water, by weight, positioning a second electrode substantially free of cobalt in said electrolyte, compartmenting said electrodes by means of a diaphragm placed between said electrodes, subjecting said electrodes to an alternating potential; and withdrawing gases generated at the electrodes through separate withdrawal means for each of said gases generated.

2. The method of claim 1 wherein the alternating current is at a potential of 8 to 20 volts.

3. The method of claim 1 wherein the electrolyte has about 1%, by weight, of water present.

4. The method of claim 1 wherein the electrolyte is composed of approximately 60% KF, 39% HF and 1% LiF.

References Cited in the file of this patent

UNITED STATES PATENTS

| | | |
|---|---|---|
| 1,214,934 | Levin | Feb. 6, 1917 |
| 2,034,458 | Calcott et al. | Mar. 17, 1936 |

OTHER REFERENCES

"Hackh's Chemical Dictionary," 2nd edition (1937), page 388.